United States Patent [19]

Shimomura

[11] Patent Number: 4,741,313
[45] Date of Patent: May 3, 1988

[54] FUEL CONTROL APPARATUS

[75] Inventor: Setsuhiro Shimomura, Himeji, Japan

[73] Assignee: Mitsubishi Denki Kabushiki Kaisha, Tokyo, Japan

[21] Appl. No.: 38,902

[22] Filed: Apr. 16, 1987

[30] Foreign Application Priority Data

Apr. 22, 1986 [JP] Japan .................. 61-95138

[51] Int. Cl.$^4$ .............................. F02D 41/18
[52] U.S. Cl. ...................... 123/494; 73/118.2; 73/204
[58] Field of Search ............. 123/478, 494, 491; 73/118.2, 204

[56] References Cited

U.S. PATENT DOCUMENTS 4,231,345 11/1980 Drews et al. ............ 123/494 X
4,505,248 3/1985 Yuzawa et al. ............ 123/494
4,579,098 4/1986 Mattes et al. ............ 123/494

FOREIGN PATENT DOCUMENTS 2446512 8/1980 France .
76182 6/1979 Japan .

Primary Examiner—Tony M. Argenbright
Attorney, Agent, or Firm—Oblon, Fisher, Spivak, McClelland & Maier

[57] ABSTRACT

A fuel control apparatus for an internal combustion engine includes an electronic control unit which has a memory to be set when the engine is operated under a given condition for a given time after a predetermined time has passed from the starting of the engine, or the engine is warmed up to reach a predetermined temperature. Burning-off operation is carried out when the memory is in the set condition after the engine has been stopped to thereby remove a deposit on a hot wire.

4 Claims, 4 Drawing Sheets

FUEL CONTROL APPARATUS

BACKGROUND OF THE INVENTION

The present invention relates to a fuel control apparatus for an internal combustion engine. More particularly, it relates to a fuel control apparatus free from a risk of firing of gasoline when a deposit on the surface of a hot-wire type intake air quantity sensor used for the fuel control apparatus is removed due to its burning at a high temperature (burning-off).

The characteristics of the hot-wire type intake air quantity sensor change depending on substances deposited on the surface of the sensors. Deposition of the substances causes an error in the quantity of fuel to be supplied to an engine, whereby there arise problems of deterioration of the exhaust gas and reduction in operational performance. To cope with such problems, the hot wire has been heretofore heated at a temperature higher than a temperature in the normal operation of the engine after the engine has been stopped to thereby burn off the deposit. A method of burning-off of the deposit is disclosed, for instance, in Japanese Unexamined Patent Publication No. 76182/1979.

It is revealed from experiments that temperature for heating the hot wire should be about 1000° C. in order to obtain an effective burning-off operation. However, when the hot wire is heated at 1000° C., a fuel-air mixture is possibly fired. The firing of the fuel-air mixture is inconvenient for the operation of the intake air quantity sensor disposed in an intake passage for a gasoline engine.

Heretofore, in order to avoid the firing of the fuel-air mixture, the burning-off operations have been carried out only when the temperature of the intake passage and the revolution of the engine satisfy predetermined conditions during its operation and the fuel-air mixture exessively supplied to the intake passage during warming-up operations for the engine is sufficiently scavenged.

However, various experiments revealed that the burning-off under the above-mentioned conditions have not provided a sufficient result, and the firing of the fuel-air mixture has sometimes occurred by the burning-off operation.

There is the possibility of the presence of a large amount of gasoline in the air intake passage due to leakage of it from the fuel control valve or the failure of an evaporation system when the engine is to be started.

When such trouble of the fuel supplying system takes place, a throttle valve may be operated for engine starting. However, the operation of the throttle valve tends to increase the revolution of the engine. Under the undesired condition, if the engine is stopped without a sufficient time for restarting the engine after the warming-up of the engine has finished, there may result such disadvantage that the gasoline is not evacuated although the conditions for the burning-off are established.

SUMMARY OF THE INVENTION

It is an object of the present invention to provide a fuel control apparatus which is free from a risk of the firing of a fuel by burning-off operation.

The foregoing and the other objects of the present invention have been attained by providing a fuel control apparatus which comprises a first means for supplying a fuel to an internal combustion engine depending on the operation of a fuel control valve, a hot-wire type intake air quantity sensor disposed in an air intake passage for the internal combustion engine to detect the quantity of air passing therethrough, and a second means which calculates the quantity of the fuel required to operate the combustion engine based on an output of the hot-wire type intake air quantity sensor and controls the first means based on a calculated value so that an optimum quantity of the fuel is supplied to the combustion engine by controlling the fuel control valve, the second means comprising a memory which gives a setting condition when the combustion engine is operated under a given condition for a given time after a predetermined time has passed from the starting of the combustion engine or the combustion engine is warmed up to reach a predetermined temperature, wherein a hot wire is heated at a temperature higher than a temperature in the normal operation of said engine when the memory is in the set condition after the combustion engine has been stopped to thereby burn-off a deposit on the hot wire.

DETAILED DESCRIPTION OF THE PREFERRED EMBODIMENTS

Preferred embodiments of the fuel control apparatus of the present invention will be described with reference to drawings.

Figure 1:
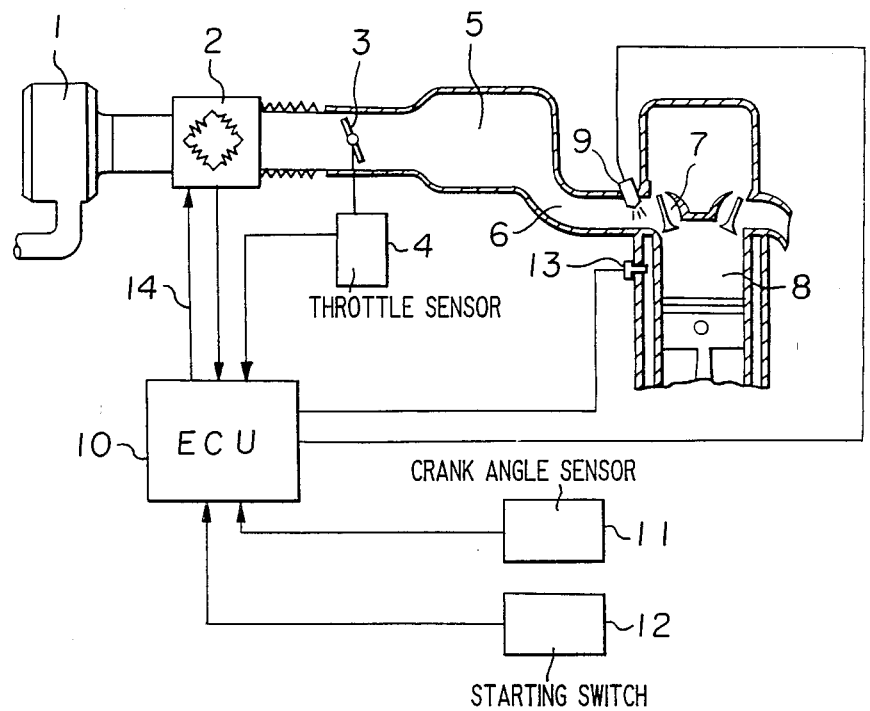
FIG. 1 is a diagram showing an embodiment of the fuel control apparatus according to the present invention.

FIG. 1 is a diagram showing the construction of an embodiment of the fuel control apparatus using a hot-wire type intake air quantity sensor 2 (hereinbelow, referred to as an AFS) for detecting the quantity of air sucked into an internal combustion engine. In FIG. 1, a reference numeral 1 designates an air cleaner and the AFS 2 is disposed in an air intake passage connected to the air cleaner. A numeral 3 designates a throttle valve for controlling the quantity of air sucked into the engine, a numeral 4 designates a throttle sensor being operable in association with the throttle valve 3 and generating a voltage signal depending on the movement of the throttle valve 3. The voltage signal is supplied to an electronic control unit (hereinbelow, referred its as an ECU). A numeral 5 designates a surge tank communicated with an intake manifold 6 which is, in turn, connected to a cylinder 8. The cylinder 8 is provided with an air inlet valve 7 driven by a cam (not shown).

In FIG. 1, only one cylinder 8 is shown for simplification of the figure although a plurality of the cylinders are in fact provided in the engine.

A fuel control valve 9 (hereinbelow referred to as an injector) is provided for each of the cylinders 8. The electronic control unit controls an amount of the fuel injected from the injector 9 at a predetermined air-fuel ratio with respect to the quantity of air sucked to each of the cylinders 8. The ECU 10 determines the fuel quantity to be injected on the basis of each signal from the AFS 2, a crank angle sensor 11, a starting switch 12, a temperature sensor 13 for detecting the temperature of cooling water for the engine and the throttle sensor 4, and controls the pulse width for feeding the fuel so that the fuel is intermittently injected from the injector 9 in synchronism with the signal of the crank angle sensor 11 at a constant interval.

The ECU 10 generates a burning-off control signal 14 when conditions for the burning-off are all satisfied. The construction and function related to control of the burning-off of the AFS 2 are well known, therefore description is omitted.

Figure 2:
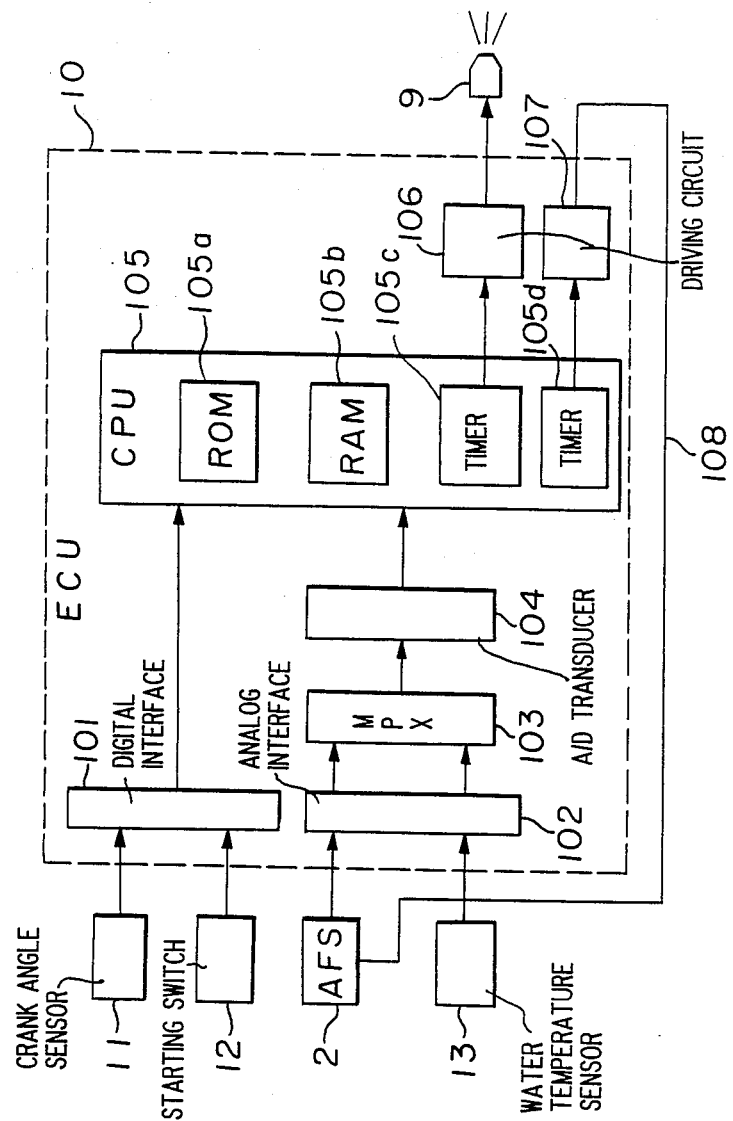
FIG. 2 is a block diagram showing an embodiment of the electronic control unit used for the fuel control apparatus shown in FIG. 1.

FIG. 2 is a block diagram showing an internal structure of the ECU 10. In FIG. 2, a reference numeral 101 designates an interface circuit for inputting digital values from the crank angle sensor 11 and the starting switch 12.

An analogue interface circuit 102 receives each signal from the AFS 2 and the water temperature sensor 13. A reference numeral 103 designates a multiplexer which receives analogue signals from the AFS 2 and the water temperature sensor 13 through the analogue interface circuit 102 to feed them to an analogue-digital (A/D) transducer 104 for analogue-digital conversion of signal.

Figure 3:
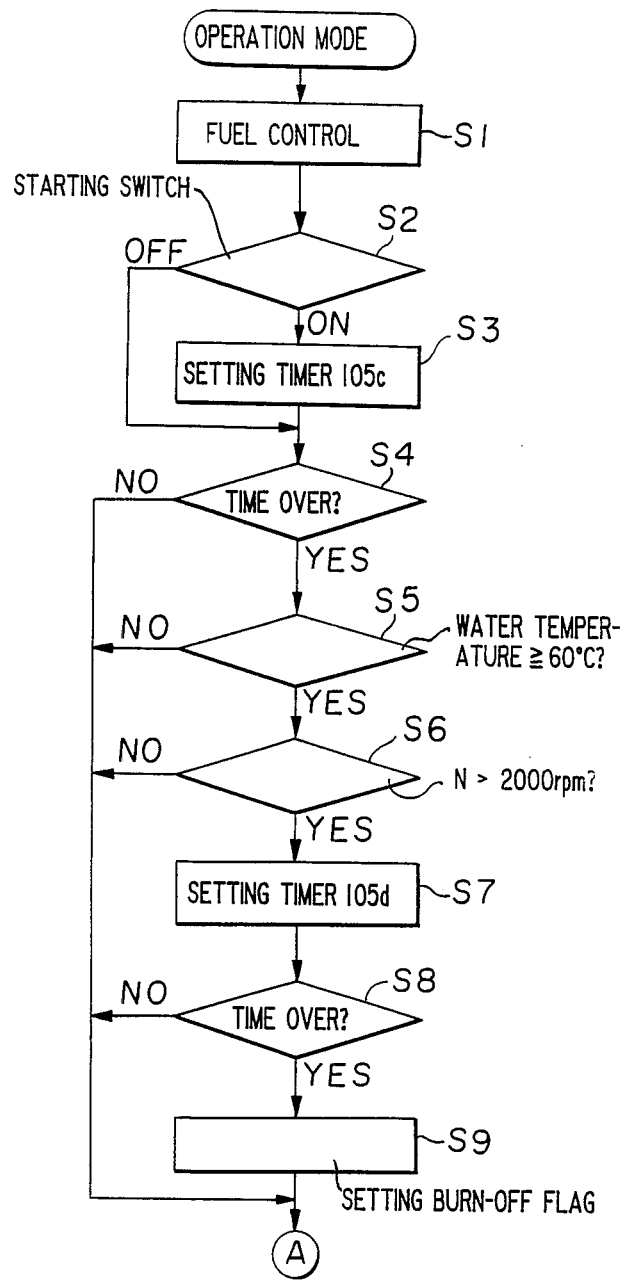
FIGS. 3 and 4 show a flow chart showing an example of execution of a program in an ECU for the fuel control apparatus of the present invention.
Figure 4:
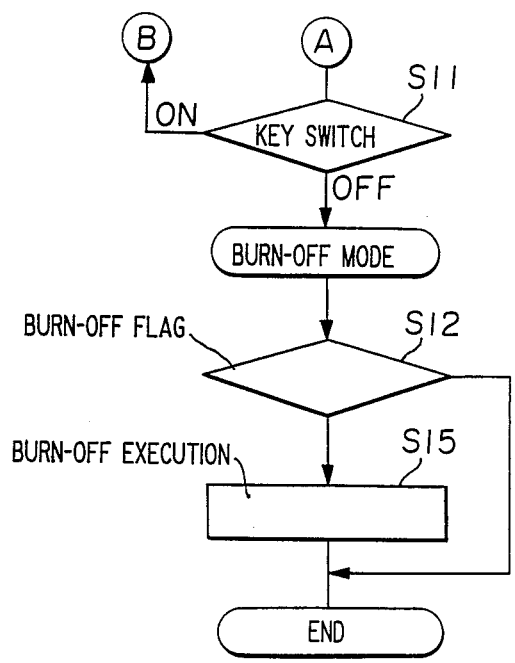

The CPU 105 includes an ROM 105a, an RAM 105b and timers 105c and 105d. The CPU calculates the pulse width for actuating the injector according to a program stored in the ROM 105a on the basis of the signals from the interface circuit 101 and the A/D transducer 104, and outputs a pulse having a predetermined time width through the timer 105c. A driving circuit 106 amplifies the pulse signal to drive the injector 9. A system for controlling the quantity of the fuel is known, and therefore description is omitted. The timer 105d is adapted to produce a burning-off pulse singal according to a programmed operation as shown in FIGS. 3 and 4. The pulse signal is amplified in the driving circuit 107 to be supplied as a burning-off signal 108 to the AFS 2.

A program related to the burning-off operation of an embodiment of the fuel control apparatus will be described with reference to FIGS. 3 and 4.

In operation mode, a series of fuel controlling operations are carried out at Step S1. Description concerning the fuel control operations is omitted because it is well known.

At Step S2, determination is made as to whether the starting switch 12 is in ON state or OFF state. When the starting switch 12 is in ON state, the timer 105c continues its set condition at Step S3. If not, the timer 105c is not set.

A state of the timer 105c is judged at Step S4. If a predetermined time is over, the temperature of water is detected at Step S5. When the water temperature is 60° C. or higher, then, the revolution of the engine is detected at Step S6. When the revolution is 2000 rpm or higher, the timer 105d is actuated at Step S7.

At Step S8, the state of the timer 105d is judged. If a predetermined time for the timer 105d is over, a burning-off flag is set at Step S9.

In the program shown in FIGS. 3 and 4, there is a by-pass to jump over Step S9 unless the predetermined time is over for each of the timers 105c, 105d; the water temperature exceeds 60° C., and the revolution of the engine exceeds 2000 rpm. Accordingly, under the above-mentioned conditions, the burning-off flag is not set.

The state of a key switch is detected at Step S11 (FIG. 4). If the key switch is in ON state, the sequential operation is returned to Step S1 (FIG. 3) since the operation mode for the engine continues. If the key switch is in OFF state, the operation mode is changed to burning-off mode.

At Step S12, the state of the burning-off flag is judged. When the burning-off flag is set, then, Step S15 is taken to carry out the burning-off operation.

In the burning-off operation, a pulse having a predetermined width in time such as about one second is generated to the AFS 2 as the burning-off signal.

The discussion as above-mentioned concerns the case that the burning-off flag is in a set condition. However, when the burning-off flag is still in a reset condition, the sequential operation is finished without Step S15 at which the burning-off operation is carried out.

In the above-mentioned embodiment, the water temperature and the revolution of the engine are used to determine the operational condition for the burning-off. However, it is possible to use outputs from the AFS 2, an air-fuel ratio sensor, or an intake air temperature sensor to determine the operational condition.

The timer 105c can be commonly used for a timer which is used for fuel supply immediately after the initiation of the combustion engine.

The timer 105d can be so adapted that it operates when the engine is continuously operated under a predetermined condition, or it is operated by the integration of time under a predetermined condition.

Further, the timer 105d may be of an intake air quantity integration type.

Thus, in the present invention, determination is made as to whether or not the condition for the burning-off is satisfied after a predetermined time has passed from the starting of the engine. Further, the burning-off operation is carried out some time after operation under a permissible condition continues for a predetermined time. In the present invention there is no risk of the firing of gasoline by the burning-off operation.

The above-mentioned effect can be obtained by some modification of an existing program.

I claim:

1. A fuel control apparatus which comprises:
a first means for supplying a fuel to an internal combustion engine depending on the operation of a fuel control valve,
a hot-wire type intake air quantity sensor disposed in an air intake passage for the internal combustion engine to detect the quantity of air passing therethrough, and
a second means for calculating the quantity of the fuel required to operate the combustion engine based on an output of said hot-wire type intake air quantity sensor and controlling the first means based on a calculated value so that an optimum quantity of the fuel is supplied to said combustion engine by controlling said fuel control valve, said second means comprising a memory which gives a setting condition when said combustion engine is operated under a given condition for a given time after a predetermined time has passed from the starting of the combustion engine, and said combustion engine is warmed up to reach a predetermined temperature, wherein a hot wire is heated at a temperature higher than a temperature in the normal operation of said engine when said memory is in the set condition after said combustion engine has been stopped to thereby burn-off a deposit on said hot wire.

2. The fuel control apparatus according to claim 1, wherein said memory comprises means set when predetermined conditions are satisfied.

3. The fuel control apparatus according to claim 1, wherein said memory comprises means set when a predetermined time is over, the temperature of water reaches a predetermined level and the revolution of said engine increases to a given speed.

4. The fuel control apparatus according to claim 1 including means for separately counting said first and second timers before said memory is not.

* * * * *